US009052726B2

(12) United States Patent
Baek et al.

(10) Patent No.: US 9,052,726 B2
(45) Date of Patent: Jun. 9, 2015

(54) METHOD OF CONTROLLING MULTI LEVEL CONVERTER

(71) Applicants: LSIS CO., LTD., Anyang-si, Gyeonggi-do (KR); INDUSTRY-ACADEMIC COOPERATION FOUNDATION, YONSEI UNIVERSITY, Seoul (KR)

(72) Inventors: Seung Taek Baek, Anyang-si (KR); Gum Tae Son, Seoul (KR); Kyeon Hur, Seoul (KR); Jung Wook Park, Seoul (KR); Hee Jin Lee, Seoul (KR); Yong Ho Chung, Ansan-si (KR); Wook Hwa Lee, Incheon (KR)

(73) Assignees: LSIS Co., Ltd., Anyang-Si, Gyeonggi-Do (KR); Industry-Academic Cooperation Foundation, Yonsei University, Seoul (KR)

( * ) Notice: Subject to any disclaimer, the term of this patent is extended or adjusted under 35 U.S.C. 154(b) by 410 days.

(21) Appl. No.: 13/730,309

(22) Filed: Dec. 28, 2012

(65) Prior Publication Data
US 2013/0169257 A1  Jul. 4, 2013

(30) Foreign Application Priority Data
Dec. 30, 2011 (KR) .......................... 10-2011-0147317

(51) Int. Cl.
*G05F 3/02* (2006.01)
*H02M 7/483* (2007.01)
(Continued)

(52) U.S. Cl.
CPC ................ *G05F 3/02* (2013.01); *H02M 3/158* (2013.01); *H02M 1/42* (2013.01); *H02M 7/483* (2013.01); *H02M 2007/4835* (2013.01)

(58) Field of Classification Search
CPC ..... H02M 1/42; H02M 7/483; H02M 2007/4835
USPC ....................................... 363/65–72, 123–139
See application file for complete search history.

(56) References Cited

U.S. PATENT DOCUMENTS 5,642,275 A * 6/1997 Peng et al. .................... 363/137
6,459,596 B1 * 10/2002 Corzine ......................... 363/37
(Continued)

FOREIGN PATENT DOCUMENTS

CN    102130452    7/2011
CN    102130619    7/2011
(Continued)

OTHER PUBLICATIONS

Japan Patent Office Application Serial No. 2012-285386, Office Action dated Jan. 9, 2014, 4 pages.
(Continued)

*Primary Examiner* — Jessica Han
(74) *Attorney, Agent, or Firm* — Lee, Hong, Degerman, Kang & Waimey

(57) ABSTRACT

A method of controlling a multilevel converter is provided. In the method of controlling a multilevel converter according to an embodiment, a sub-module having the maximum voltage and a sub-module having the minimum voltage respectively are extracted from among a plurality of sub-modules. An amount of state variation of each of the plurality of sub-modules is determined. When the amount of state variation is not determined to be 0, a direction of a current flowing through the plurality of sub-modules is detected. A subsequent state of at least one sub-module is determined according to at least one of the amount of the state variation and current direction. Subsequently an arrangement time for sub-module values can be efficiently reduced while the number of the sub-modules increases in the voltage balancing.

8 Claims, 3 Drawing Sheets

(51) Int. Cl.
    *H02M 3/158*     (2006.01)
    *H02M 1/42*     (2007.01)

(56) References Cited

U.S. PATENT DOCUMENTS

| | | | | |
|---|---|---|---|---|
| 7,960,871 | B2 * | 6/2011 | Dommaschk et al. | 307/151 |
| 8,159,840 | B2 * | 4/2012 | Yun | 363/39 |
| 8,390,259 | B2 * | 3/2013 | Dommaschk et al. | 320/166 |
| 2012/0127766 | A1 * | 5/2012 | Crookes et al. | 363/126 |
| 2014/0002048 | A1 * | 1/2014 | Pang et al. | 323/304 |

FOREIGN PATENT DOCUMENTS

| | | |
|---|---|---|
| CN | 102170123 | 8/2011 |
| JP | 2009-232681 | 10/2009 |
| JP | 2010-517496 | 5/2010 |
| JP | 2011-182517 | 9/2011 |
| JP | 2011-223761 | 11/2011 |
| JP | 2011-223784 | 11/2011 |
| JP | 2012-65437 | 3/2012 |
| WO | 2008/086760 | 7/2008 |

OTHER PUBLICATIONS

European Patent Office Application Serial No. 12198427.2, Search Report dated Dec. 22, 2014, 7 pages.
Japan Patent Office Application Serial No. 2012-285386, Office Action dated Jan. 22, 2015, 2 pages.
Son, et al., "Design and Control of a Modular Multilevel HVDC Converter with Redundant Power Modules for Noninterruptible Energy Transfer," IEEE Transactions on Power Delivery, vol. 27, No. 3, Jul. 2012, pp. 1611-1619.
Saeedifard, et al., "Dynamic Performance of a Modular Multilevel Back-to-Back HVDC System," IEEE Transactions on Power Delivery, vol. 25, No. 4, Oct. 2010, pp. 2903-2912.
The State Intellectual Property Office of the People's Republic of China Application Serial No. 201210587624.9, Office Action dated Sep. 10, 2014, 6 pages.

* cited by examiner

METHOD OF CONTROLLING MULTI LEVEL CONVERTER

CROSS-REFERENCE TO RELATED APPLICATIONS

Pursuant to 35 U.S.C. §119(a), this application claims the benefit of earlier filing date and right of priority to Korean Patent Application No. 10-2011-0147317, filed on Dec. 30, 2011, the contents of which are hereby incorporated by reference herein in their entirety.

BACKGROUND

The present disclosure relates to a method of controlling a multilevel converter, and more particularly, to a method of controlling a multilevel converter for improving a processing time by adopting a switching scheme for voltage balancing.

A gate switching scheme in consideration of voltage balance is used in a multilevel converter system in the related art. In the voltage balancing in the related art, information inputted during a modulation and capacitor voltage information outputted from every sub-module inside an arm are arranged in order of a voltage level. A sub-module is selected using information processed in this way. Specifically a mechanism is employed, in which a sub-module having the highest voltage or the lowest voltage is selected according to current information of the corresponding arm.

According to the voltage balancing in the related art, it is first determined how many sub-modules output an ON signal, and it is then determined which sub-module in one arm is to be in ON state. At this time, a sorting operation of comparing voltage values for the respective sub-modules with each other and arranging the compared voltage values is performed in order to equally distribute the voltages of the sub-modules. Since the sub-modules in ON state are charged and discharged according to an arm current direction, a sub-module having the minimum voltage is selected to be charged when the arm current value is positive and a sub-module having the maximum voltage is selected to be discharged when the arm current value is negative.

FIG. 1 is a view illustrating the voltage balancing in the related art. That is, the number of sub-modules satisfying the ON condition is determined in operation S10 and the sub-modules are sorted according to voltage values in operation S20. Then, a sign of a current value is determined in operation S30. When it is determined that the sign of the current value is positive (YES) in operation S30, the minimum voltage is selected in operation S40. When it is determined that the sign of the current value is negative (NO) in operation S30, the maximum voltage is selected in operation S50.

According to the related art, the longest time is taken in the operation S20 of sorting the sub-modules according to the voltage values. In particular, for a module based multilevel converter applied to large capacity electric power devices, 150 to 200 or more sub-modules are provided in a single arm. A digital processing operation is divided into total 4 sub-operations including converting voltage values of sub-modules into digital values, arranging the converted sub-module values, selecting a sub-module according to a current direction, and applying the sub-module value as a gate signal of the selected sub-module.

Here, the first and second sub-operations, that is, converting of voltage values into digital values and arranging of the converted digital values require much a lot of time. Furthermore, the required time for these two operations also increases infinitely in proportion to an increase in number of sub-modules.

SUMMARY

Embodiments provide a method of controlling a multilevel converter in which an arrangement time for sub-module values can be efficiently reduced in voltage balancing.

In an embodiment, a method includes extracting a sub-module having the maximum voltage and a sub-module having the minimum voltage respectively among a plurality of sub-modules; determining an amount of state variation of each of the plurality of sub-modules; when the amount of state variation is not determined to be 0, detecting a direction of a current flowing through the plurality of sub-modules; and determining a subsequent state of at least one sub-module according to at least one of the amount of state variation and current direction.

The amount of state variation of each of the plurality of sub-modules may be a value obtained by subtracting number of sub-modules in ON state in a previous sampling from number of sub-modules in ON state in a current sampling.

The determining of a subsequent state of at least one sub-module may be repeated number of times corresponding to the amount of the state variation to determine the subsequent state of said at least one sub-module.

The determining of a subsequent state of at least one sub-module may includes determining the subsequent state of any one of the sub-module having the maximum voltage and the sub-module having the minimum voltage when the subsequent state is determined first.

The determining of a subsequent state of at least one sub-module may include determining the subsequent state such that the state of the sub-module having the maximum voltage from OFF state to ON state when the amount of state variation is positive and the current direction is identical to an arm current direction, and the state of the sub-module having the minimum voltage switches from OFF state to ON state when the amount of state variation is positive and the current direction is opposite to the arm current direction.

The determining of a subsequent state of at least one sub-module may include determining the subsequent state such that the state of the sub-module having the maximum voltage switches from ON state to OFF state when the amount of state variation is negative and the current direction is identical to an arm current direction, and the state of the sub-module having the minimum voltage switches from ON state to OFF state when the amount of state variation is negative and the current direction is opposite to the arm current direction.

The determining of a subsequent state of at least one sub-module may include determining the subsequent state such that the subsequent state of at least one sub-module except the sub-modules having the maximum and minimum voltages among the plurality of sub-modules is randomly varied when the determining of the subsequent state is not performed first.

The method may further include discriminating a current state of each of the plurality of sub-modules between ON state and OFF state before the extracting of the sub-module having the maximum voltage and the sub-module having the minimum voltage respectively.

In accordance with the method of controlling a multilevel converter according to the embodiments, an arrangement time for sub-module values can be efficiently reduced even though the number of the sub-modules increases in the voltage balancing.

DETAILED DESCRIPTION OF THE EMBODIMENTS

Reference will now be made in detail to the embodiments of the present disclosure, examples of which are illustrated in the accompanying drawings.

A method of controlling a multilevel converter according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

In the following description, detailed descriptions of well-known functions or constructions will be omitted since they would obscure the invention in unnecessary detail.

Figure 1:
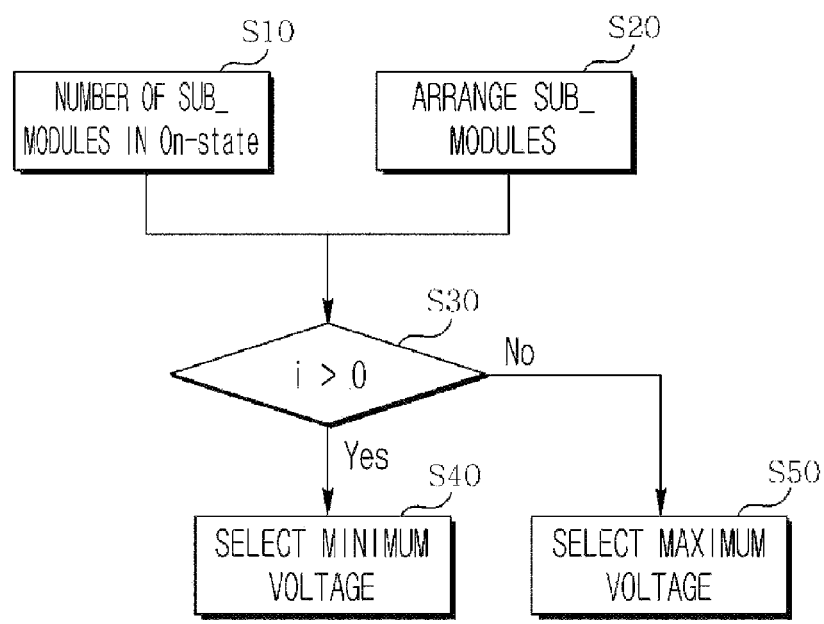
FIG. 1 is a view illustrating an operation method in the related art.
Figure 2:
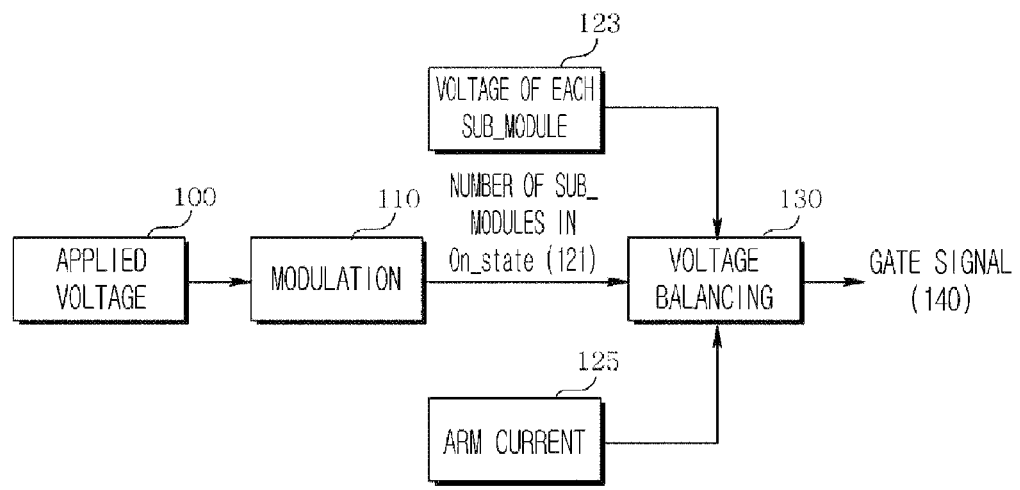
FIG. 2 is a view illustrating a basic flow of a method of controlling a multilevel converter according to an embodiment.

FIG. 2 is a view illustrating a basic flow of a method of controlling a multilevel converter according to an embodiment.

Firstly, a voltage applied according to a purpose of an electric power device is measured in operation 100. The measured voltage is modulated in operation 110. At this time voltage balancing is performed in operation 130 by measuring the number of sub-modules in ON state, each sub-module voltage and an arm current direction in operations 121, 123 and 125, respectively. Finally a gate signal is generated for controlling each sub module in operation 140.

In particular, the embodiment is characterized in that the voltage balancing in operation 130 is performed on the basis of the number of the ON state sub-modules measured in operation 121, each sub-module voltage measured in operation 123 and the arm current direction measured in operation 125. The voltage balancing operation will be described in detail as follows.

Firstly, a gate signal in a previous state is measured. The sub-modules in ON state are measured and the number of the same is calculated. Also, the sub-modules in OFF state are measured and the number of the same is calculated.

Meanwhile a voltage of each of the sub-modules in ON state is measured and the sub-modules having the maximum voltage and the sub-module having the minimum voltage are extracted. This operation is performed by determining the maximum and minimum voltages and extracting the corresponding sub-modules.

Then a difference value is obtained by subtracting the number of ON state sub-modules measured through a current modulation from the number of ON state sub-modules measured through a previous modulation. Here, the positive difference value means the number of sub-modules to be in ON state is larger than the number of the previous ON state sub-modules, and the negative difference value means the number of sub-modules to be in ON state is smaller than the number of the previous ON state sub-modules.

The control of the sub-modules is repeated number of times corresponding to the difference value. For example, when the difference value is n, the control of the sub-modules is repeated n number of times, wherein the sub-module having the determined maximum or minimum voltage value is controlled first. That is, a sign of the difference is determined first, and then the sub-module having the maximum or minimum voltage is controlled with reference to the arm current direction.

When the difference value is positive and the current flows in the arm current direction, a sub-module having the minimum voltage value and being in OFF state is controlled to switch to ON state. When the difference value is positive and the current flows in a direction opposite to the arm current direction, a sub-module having the maximum voltage value and being in OFF state is controlled to switch to ON state.

On the contrary, when the difference value is negative and the current flows in the arm current direction, a sub-module having the maximum voltage value and in ON state is controlled to switch to OFF state. When the difference is negative and the current flows in a direction opposite to the arm current direction, a sub-module having the minimum voltage value and being in ON state is controlled to switch to OFF state.

In a case where the next second, third, . . . , and n-th controls are repeated, the sub-module having the maximum or minimum voltage value is not controlled as in the first control, but a sub-module randomly selected among the provided sub-modules is controlled.

Specifically, when the difference value is positive and the current flows in the arm current direction, a sub-module in OFF state is randomly selected and controlled to switch to ON state. Meanwhile when the difference value is positive and the current flows in a direction opposite to the arm current direction, a sub-module in OFF state is randomly selected and controlled to switch to ON state.

On the contrary, when the difference value is negative and the current flows in the arm current direction, a sub-module in ON state is randomly selected and controlled to switch to OFF state. When the difference is negative and the current flows in a direction opposite to the arm current direction, a sub-module in ON state is randomly selected and controlled to switch to OFF state.

In this way, when the difference value is negative, a balance is achieved by switching a state of a sub-module from ON state to OFF state. When the difference is positive, a balance is achieved by switching a state of a sub-module from OFF state to ON state.

After these operations are repeated n times, the gate signal is output to control each sub-module.

According to the multilevel converter control method of the embodiment, an operation of arranging all the sub-modules in order of a voltage level which has been used in the related art method may be omitted. Therefore a time taken to arrange sub-module values can be efficiently reduced even though the number of sub-modules increases in the voltage balancing.

Figure 3:
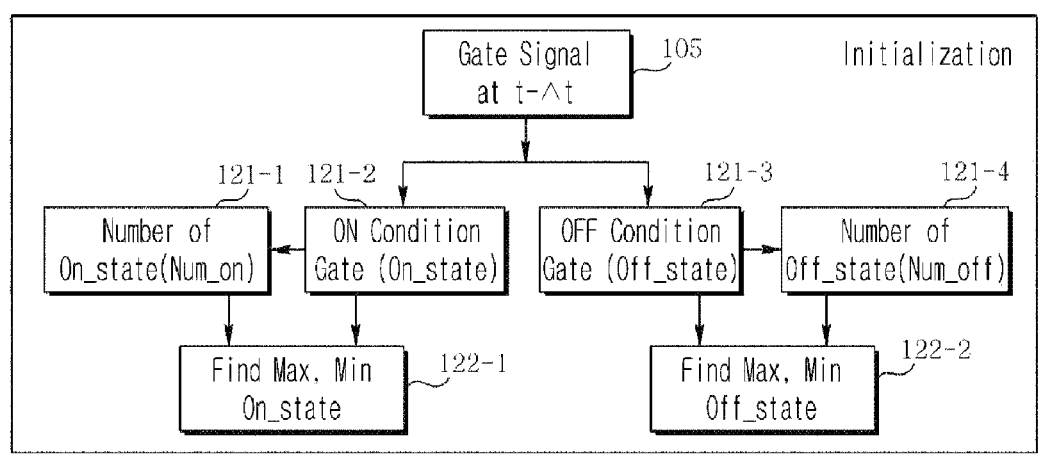
FIG. 3 is a view illustrating a flow of a method of controlling a multilevel converter according to another embodiment.
Figure 4:
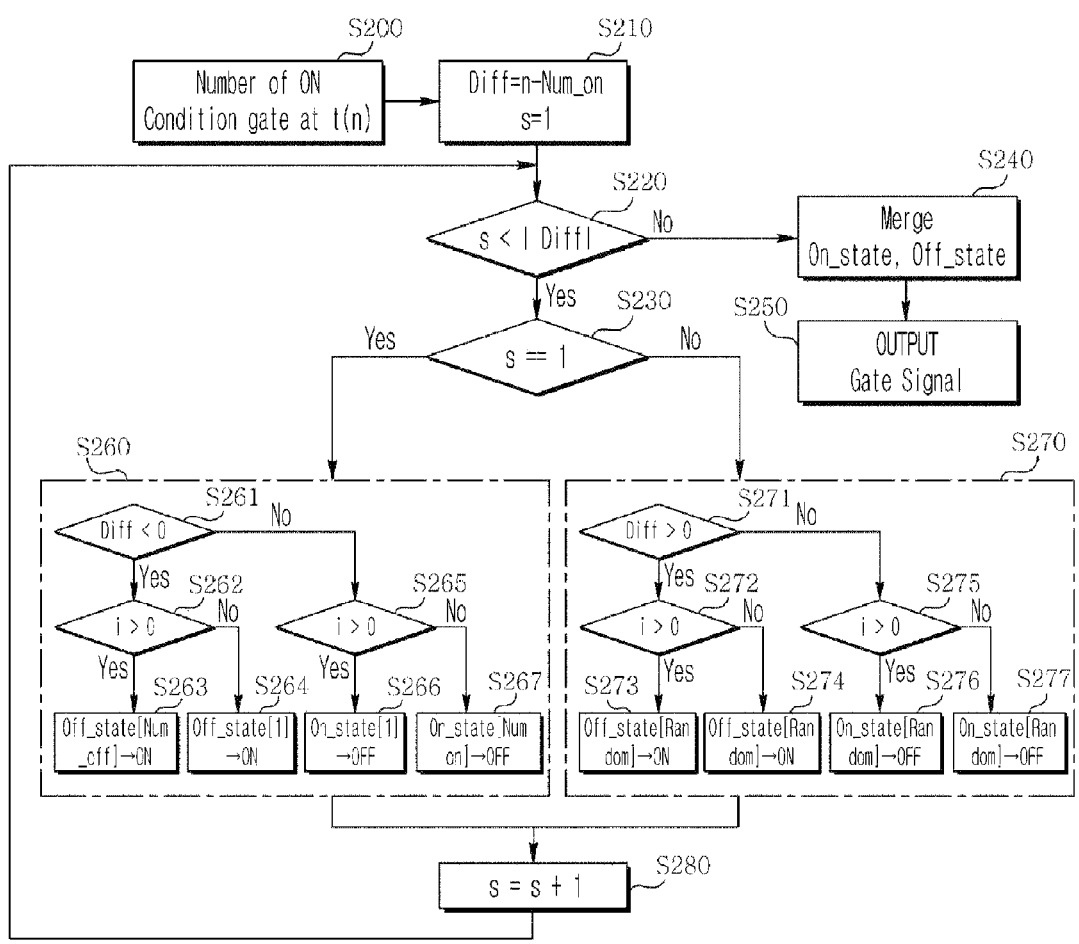
FIG. 4 is a view illustrating a flow of a method of controlling a multilevel converter according to further another embodiment.

FIGS. 3 and 4 are views illustrating a flow of a method of controlling a multilevel converter according to embodiments.

Firstly a gate signal is determined at the time (t−Δt) in operation 105. This makes it possible to know an immediately previous state of a sub-module. Namely, an immediately previous ON/OFF state of a sub-module can be known. After determining ON/OFF state of each provided sub-module, states of the sub-modules are divided into ON state and OFF state in operation 121-2 and 121-3. The reason why to do this is for a fast control of the sub-modules.

Total sums of the numbers of the sub-modules in OFF state and ON state are calculated respectively in operation 121-1 and 121-4. That is, the number of ON state sub-modules and the number of OFF state modules are determined using the immediately previous gate signal in operation 105.

In operation S122-1, a sub-module having the maximum voltage and a sub-module having the minimum voltage are determined from among the ON state sub-modules. In operation S122-2, the sub-module having the maximum voltage and the sub-module having the lowest voltage are determined from among the OFF state sub-modules.

Operations described hitherto are called initialization which is a basic operation for multilevel converter control method according to an embodiment.

Operations after the initialization are illustrated in FIG. 4. As illustrated in FIG. 4, the number of sub-modules to be in ON state, which is the number of ON condition gate at t(n), is obtained in operation S200. Then the number of the immediately previous ON state sub-modules determined in the initialization is subtracted from the number of sub-modules to be in ON state in operation S210. The difference value thereof, namely Diff, becomes the basis for determining how many sub-modules are to be controlled. When the number of sub-modules to be in ON state is greater than the previous one, Diff becomes positive and when the number of sub-modules to be in ON state is smaller than the previous one, Diff becomes negative.

Then the number of times for switching state of sub-modules is determined in operation S220. Specifically, the number of times for switching states of sub-modules is determined by Diff. Namely the number of sub-modules to be in ON state is 10 and the number of immediately previous ON state sub-modules is 7, then control of the sub-modules is performed 3 times since 3 sub-modules perform state-switching.

When it is determined that it is the first control (YES) in operation S230, operation S260 is performed. When it is determined that it is a subsequent control (NO) in operation S230, operation S270 is performed.

In operation S260, a sign of Diff is determined. When it is determined that the sign is positive (YES) in operation S261, a direction of a current i which flows through a sub-module is determined. When the current i flows in the arm current direction in operation in S262, an OFF state sub-module is controlled and more particularly the sub-module having the minimum voltage determined in the initialization is controlled in operation S263. At this time the sub-module having the minimum voltage is controlled to switch from OFF state to ON state.

On the contrary, when the current i flows in a direction opposite to the arm current direction (NO) in operation in S262, the OFF state sub-module is controlled and more particularly the sub-module having the maximum voltage determined in the initialization is controlled in operation S264. Namely the sub-module having the maximum voltage is controlled to be in ON state.

When it is determined that Diff is negative (NO) in operation S261, operations are reversed. Namely, Diff is determined to be negative (NO) in operation S261, the current flowing through the sub-module is detected. When the current flows in the arm current direction (YES) in operation S265, the sub-module in ON state is controlled to switch to OFF state. Here the sub-module controlled to be in OFF state is the sub-module having the maximum voltage found in the initialization.

When the current flows in the opposite direction to the arm current direction (NO) in operation S265, the sub-module in ON state is controlled to switch to OFF state. Here the sub-module controlled to be in OFF state is the sub-module having the minimum voltage found in the initialization.

As the foregoing description, the sub-module having the maximum voltage or the minimum voltage is controlled first.

When Diff is 2 or more, the operation returns to S220. Here, s denotes number of times of repeating the sub-module control. In operation S280, s increases by 1, which means a subsequent control of the sub-module is the second.

When s is determined to be still smaller (YES) than Diff in operation S220, the operation proceeds to S230. When it is not determined to be the first (NO) in operation S230, the operation proceeds to S270.

In operation S270, a sub-module is controlled based on Diff and the current direction. Here the sub-module is not the sub-module having the maximum voltage or the minimum voltage, but the sub-module randomly selected from sub-modules except the sub-module having the maximum voltage or the minimum voltage.

When Diff is positive (YES) in operation S271 and a direction of the current flowing through the sub-module is identical to the arm current direction (YES) in operation S272, an OFF state module is randomly selected and controlled in ON state in operation S273. The direction of the current flowing through the sub-module is opposite to the arm current direction (NO) in operation S272, the OFF state module is randomly selected and controlled in ON state in operation S274.

On the contrary, when Diff is negative (NO) in operation S271 and a direction of the current flowing through the sub-module is identical to the arm current direction (YES) in operation S275, an ON state module is randomly selected and controlled in OFF state in operation S276. The direction of the current flowing through the sub-module is opposite to the arm current direction (NO) in operation S275, the ON state module is randomly selected and controlled in OFF state in operation S277.

The foregoing operations are complete, then s increases by 1 and the operation returns to S220. When s is smaller than Diff (YES) in operation S220, operation S270 is performed after operation S230. When a condition in operation S220 is not satisfied (NO) in operation S220, namely, Diff and s are equal, a signal for controlling each sub-module in previous operations are integrated and output newly as a gate signal in operation S250. The ON/OFF state of each module is switched by the gate signal. Then the initialization as shown in FIG. 3 and the gate signal output operation as shown in FIG. 4 are repeated to control the sub-modules.

According to the embodiments as described in the foregoing, an operation of arranging all the sub-module voltages can be omitted, which takes the longest time in the voltage balancing and the sub-modules can be rapidly controlled by calculating only the maximum and minimum voltages. Therefore switching can be distributed uniformly among sub-modules. This kind of economy of time can provide an environment in which memory use and function addition are flexibly treated, and function and reliability of the product can be improved. In addition it can also be expected to reduce a unit cost of the product, since the same effect can be obtained by using a cheap processor without an expensive processor having a rapid calculation speed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a multilevel converter, comprising:
    extracting a sub-module having the maximum voltage and a sub-module having the minimum voltage respectively from among a plurality of sub-modules;
    determining an amount of state variation of each of the plurality of sub-modules;
    when the amount of state variation is not determined to be 0, detecting a direction of a current flowing through the plurality of sub-modules; and
    determining a subsequent state of at least one sub-module according to at least one of the amount of state variation and current direction.

2. The method according to claim 1, wherein the amount of state variation of each of the plurality of sub-modules is a value obtained by subtracting number of sub-modules in ON state in a previous sampling from number of sub-modules in ON state in a current sampling.

3. The method according to claim 1, wherein the determining of a subsequent state of at least one sub-module is repeated number of times corresponding to the amount of the state variation to determine the subsequent state of said at least one sub-module.

4. The method according to claim 1, wherein the determining of a subsequent state of at least one sub-module comprises determining the subsequent state of any one of the sub-module having the maximum voltage and the sub-module having the minimum voltage when the subsequent state is determined first.

5. The method according to claim 4, wherein the determining of a subsequent state of at least one sub-module comprises determining the subsequent state such that the state of the sub-module having the maximum voltage switches from OFF state to ON state when the amount of state variation is positive and the current direction is identical to an arm current direction, and the state of the sub-module having the minimum voltage switches from OFF state to ON state when the amount of state variation is positive and the current direction is opposite to the arm current direction.

6. The method according to claim 4, wherein the determining of a subsequent state of at least one sub-module comprises determining the subsequent state such that the state of the sub-module having the maximum voltage switches from ON state to OFF state when the amount of state variation is negative and the current direction is identical to an arm current direction, and the state of the sub-module having the minimum voltage switches from ON state to OFF state when the amount of state variation is negative and the current direction is opposite to the arm current direction.

7. The method according to claim 1, wherein the determining of a subsequent state of at least one sub-module comprises determining the subsequent state such that the subsequent state of at least one sub-module except the sub-modules having the maximum and minimum voltages among the plurality of sub-modules is randomly varied when the determining of the subsequent state is not performed first.

8. The method according to claim 1, further comprising discriminating a current state of each of the plurality of sub-modules between ON state and OFF state before the extracting of the sub-module having the maximum voltage and the sub-module having the minimum voltage respectively.

\* \* \* \* \*